United States Patent [19]

Okada et al.

[11] Patent Number: 5,777,710
[45] Date of Patent: Jul. 7, 1998

[54] ELECTRODE SUBSTRATE, MAKING THE SAME, LIQUID CRYSTAL DEVICE PROVIDED THEREWITH, AND MAKING THE SAME

[75] Inventors: Shinjiro Okada, Isehara; Haruo Tomono, Machida; Yuji Matsuo, Kawasaki, all of Japan

[73] Assignee: Canon Kabushiki Kaisha, Tokyo, Japan

[21] Appl. No.: 637,180

[22] Filed: Apr. 24, 1996

[30] Foreign Application Priority Data

Apr. 28, 1995 [JP] Japan .................. 7-106692

[51] Int. Cl.⁶ .................. G02F 1/1333; G02F 1/1343
[52] U.S. Cl. .................. 349/138; 349/147; 349/148
[58] Field of Search .................. 349/147, 148, 349/138

[56] References Cited

U.S. PATENT DOCUMENTS

| | | | |
|---|---|---|---|
| 4,815,823 | 3/1989 | Kaneko | 349/147 |
| 4,902,107 | 2/1990 | Tsuboyama et al. | 349/72 |
| 4,973,135 | 11/1990 | Okada et al. | 349/42 |
| 5,026,144 | 6/1991 | Taniguchi et al. | 340/37 |
| 5,164,850 | 11/1992 | Tanaka et al. | 349/147 |
| 5,227,899 | 7/1993 | Nobuyuki | 349/148 |
| 5,274,483 | 12/1993 | Itoh | 349/148 |
| 5,274,485 | 12/1993 | Narita et al. | 349/147 |
| 5,428,250 | 6/1995 | Ikeda et al. | 349/147 |
| 5,446,570 | 8/1995 | Kaneko et al. | 349/139 |
| 5,471,229 | 11/1995 | Okada et al. | 345/89 |
| 5,508,711 | 4/1996 | Okada | 345/97 |

FOREIGN PATENT DOCUMENTS

| | | |
|---|---|---|
| 60-233618 | 11/1985 | Japan . |
| 4-116531 | 4/1992 | Japan . |
| 06347810 | 12/1994 | Japan . |

OTHER PUBLICATIONS

N.A. Clark et al. "Ferroelectric Liquid Crystal Electro-Optics Using the Surface Stabilized Structure". Molecular Crystals and Liquid Crystals, vol. 94, pp. 213-234—1983 Gordon and Breach, Science Publishers, Inc.

Primary Examiner—William L. Sikes
Assistant Examiner—Toan Ton
Attorney, Agent, or Firm—Fitzpatrick, Cella, Harper & Scinto

[57] ABSTRACT

The present invention intends to provide an electrode substrate having at least a transparent electrode and a metal electrode provided on a transparent substrate, in which the metal electrode is formed on the transparent substrate through a dielectric layer having an irregular surface. The present invention further intends to provide a liquid crystal device having the electrode substrate, and methods for producing them. According to such a structure, the reflection of the outside light at the surface of the metal electrode can be prevented. Further, the electrode substrate can be readily produced.

35 Claims, 5 Drawing Sheets

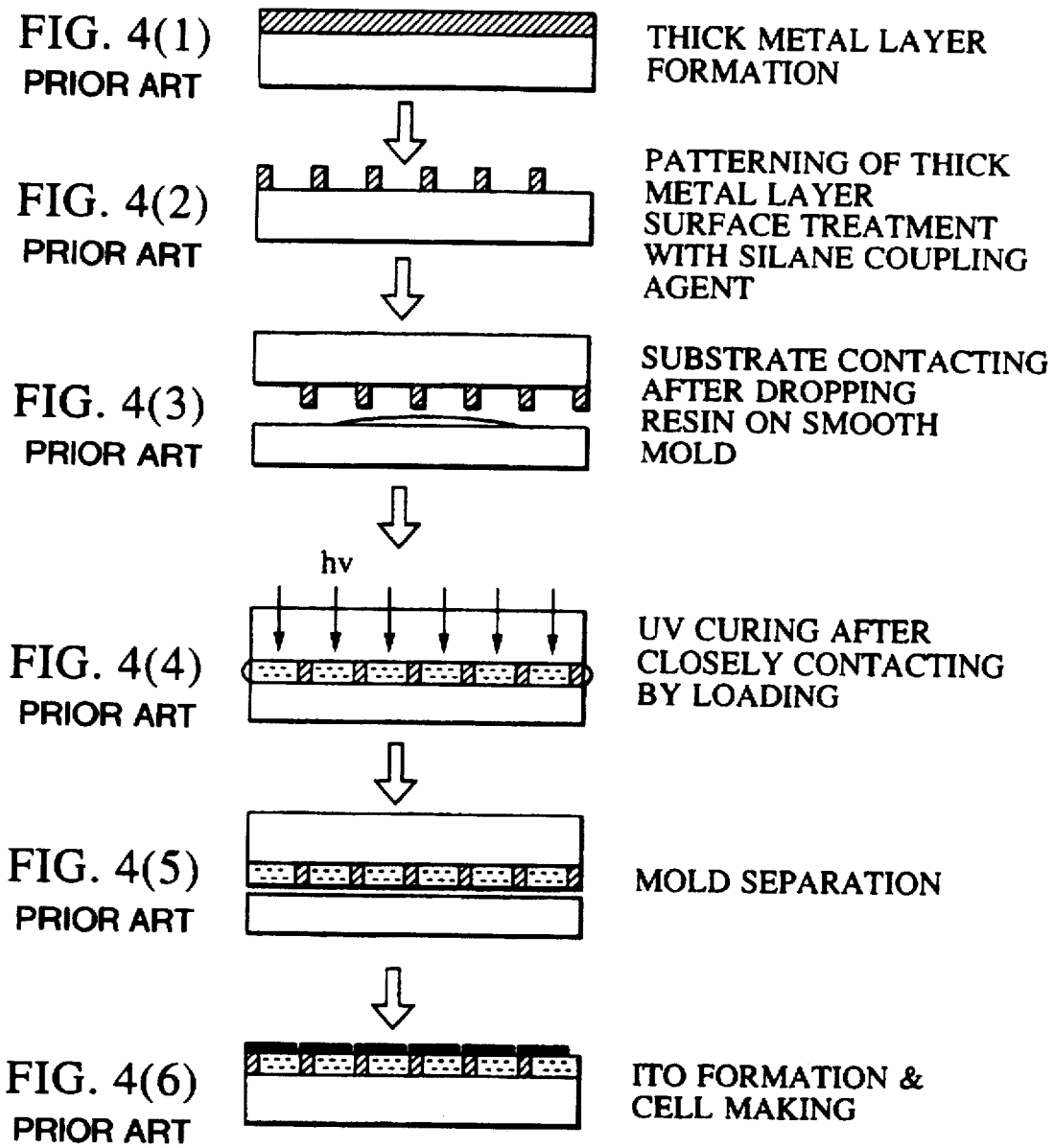

ELECTRODE SUBSTRATE, MAKING THE SAME, LIQUID CRYSTAL DEVICE PROVIDED THEREWITH, AND MAKING THE SAME

BACKGROUND OF THE INVENTION

1. Field of the Invention

The present invention relates to electrode substrates and liquid crystal devices provided therewith. In particular, the present invention relates to electrode substrates suitable for liquid crystal display (LCD) devices used as flat panel displays.

2. Description of the Related Art

In recent years, liquid crystal devices have been noted as display device substitutes for CRT displays. The liquid crystal devices generally represent the liquid crystal disposed between a pair of substrates having electrodes. The liquid crystal devices are classified as passive matrix liquid crystal devices and active matrix liquid crystal devices according to their driving methods.

Chiral smectic liquid crystal devices using chiral smectic liquid crystals exhibiting ferroelectric and/or antiferroelectric characteristics have been noted because such liquid crystal devices have a variety of advantages compared with liquid crystal devices using conventional twisted nematic liquid crystals (TN liquid crystals).

A typical structure of the passive matrix liquid crystal device will be explained with reference to FIG. 5A and 5B. FIG. 5A is a schematic cross-sectional view illustrating an embodiment of the passive matrix liquid crystal device, and FIG. 5B is a schematic plan view illustrating an embodiment of the electrode substrate used for the passive matrix liquid crystal device. The liquid crystal device is composed of liquid crystal 6 disposed between a pair of electrode substrates 81 and 82, as shown in FIG. 5A, where a chiral smectic liquid crystal having ferroelectric characteristics (ferroelectric liquid crystal) is used as the liquid crystal 6.

Each of the electrode substrates 81 and 82 comprises a glass plate 61, a transparent electrode 62 composed of striped ITO (indium tin oxide) or the like formed thereon, an insulating film (or dielectric film) 63 for preventing short circuit between the upper and lower electrodes composed of $Ta_2O_5$ or the like formed so as to cover the transparent electrode 62, and an alignment control film 64 composed of polyimide or the like formed on the insulating film 63. The upper and lower electrode substrates 81 and 82 are opposed each other so as to cross their respective transparent electrodes 62 at right angles, and bonded each other through a sealant 65.

As the chiral smectic liquid crystal, a liquid crystal showing a chiral smectic phase, such as SmC* phase, SmH* phase or the like, is generally used. An example of preferably used chiral smectic liquid crystals may be a ferroelectric liquid crystal composition in which an optically active chiral dopant is added into a liquid crystal composition containing a liquid crystal compound having a phenylpyrimidine core.

The chiral smectic liquid crystal has a twisted conformation of the longitudinal axes of the liquid crystal molecules (a spiral structure having a spiral axis in the substrate plane direction) when the distance between the upper and lower substrates (the thickness of the liquid crystal layer or the cell thickness) is long, for example not less than 100 µm, whereas by adjusting the distance between the upper and lower substrates to 1 to 3 µm, for example, the longitudinal axes of the liquid crystal molecules becomes mostly parallel to the substrate by the release of the spiral structure of the liquid crystal molecules (See N. A. Clark et al, MCLC vol. 94 (1993) p. 213 to 234).

The transparent electrode 62 composed of ITO generally has a thickness of 50 nm to 150 nm. The insulating film 63 may be formed from silicon oxide, titanium oxide or the like and generally has a thickness of 50 nm to 300 nm.

The required characteristics for transparent electrode 62 are a high light transmittance and a low resistance ratio. Liquid crystal devices are used for displays and light shutters by controlling their light transmittances. The low light transmittances of the parts, such as the transparent electrode, sometimes cause an unsatisfactory decreased contrast. In addition, liquid crystal devices are used while applying an electric field to the liquid crystal disposed between a pair of electrode substrates, and serves as capacitive load in an electric circuit. Thus, the propagation delay of the voltage waveform due to the resistance of the transparent electrode is not negligible.

The specific resistance of the transparent electrode 62 composed of ITO, however, ranges from 20 to 400 Ω for the sheet resistivity, or from $200 \times 10^{-8}$ Ωm to $4,000 \times 10^{-8}$ Ωm for the volume resistivity, and is considerably higher than those of metallic materials (for example, the volume resistivity of aluminum is around $3 \times 10^{-8}$ Ωm). When the thickness of the transparent electrode is increased to reduce the specific resistance, the light transmittance is impracticably decreased. Thus, the propagation delay of the voltage waveform due to the higher resistance of the transparent electrode is a problem to be solved with the achievement of the large area of the effective optical modulation region (or display region for the display device) and the high resolution of the liquid crystal device. In a chiral smectic liquid crystal device having a small cell gap, and in particular, a surface stabilized ferroelectric device of which cell gap is only 1 to 3 µm and one-third to one-fifth of a general TN liquid crystal device, the propagation delay of the voltage waveform inevitably increases even when the same electrode substrate is used, compared with the TN liquid crystal device having a relatively thicker cell gap.

In order to improve the problems set forth above, juxtaposition of a metal electrode, such as chromium (the volume resistivity=$15 \times 10^{-8}$ Ωm) or molybdenum (the volume resistivity =$6 \times 10^{-8}$ µm) with ITO has been carried out as disclosed in, for example, Japanese Examined Patent 6-19, 497. In such a case, however, the following problems still remain; the thickness of the metal electrode is limited due to the restricted cell gap, namely the gap between the transparent electrodes; and the metal electrode causes some orientation defects of the liquid crystal. Especially, the orientation defects are significantly observed in a chiral smectic liquid crystal device having a distinct smectic layer structure.

The reason, that the thickness of the metal electrode cannot be increased because of the restricted gap between the transparent electrodes, is as follows: For example, when the gap between the transparent electrodes is 1.1 µm, the thickness of the metal electrode formed on the ITO can be at most 550 nm, because a thickness over 550 nm causes a short circuit due to the contact of both metal electrode.

Further, the thickness of the metal electrode is generally not greater than 250 nm to prevent the orientation defects due to the metal electrode. Liquid crystal molecules are arranged in a certain order, in other words, aligned, by the alignment control film formed on the upper and lower transparent electrodes. The orientation of the liquid crystal molecules is significantly affected by the surface state of the electrode substrate.

There are some effects of the metal electrode on the orientation of the liquid crystal molecules as follows: The metal electrode has an irregular surface, and it is difficult to carry out an uniform rubbing treatment on the alignment control film due to the metal electrode itself. As a result, since orientation state of the liquid crystal molecules near the metal electrode differs from that away from the metal electrode, its optical characteristics and electric field response characteristics differ from each other at different positions. The difference of latter results in readily occurrence of crosstalk. The more the pixel size become small due to high resolution liquid crystal device, the more such effects are significant.

As a method to suppress the effects of the metal electrode on the orientation of the liquid crystal molecules, for example, Japanese Laid-Open Patent 6-347,810 discloses a method for producing an electrode substrate by forming a metal electrode pattern on a glass substrate, embedding an organic resin between the metal electrode, and forming a transparent electrode pattern composed of ITO or the like thereon.

Such a method will be explained with reference to FIGS. 4(1)–4(6). FIGS. 4(1)–4(6) are a schematic illustrative view of the method for producing an electrode substrate in which a metal electrode pattern is formed on a glass substrate, a smooth substrate is made by embedding a dielectric material, e.g. an ultraviolet-curable resin between the metal electrode, then a transparent electrode pattern composed of ITO is formed thereon.

First, a thick metal layer having a thickness of 1 to 2 μm is formed on the glass substrate as shown in FIG. 4(1). Then, a metal electrode pattern is formed by patterning the thick metal layer as shown in FIG. 4(2). The substrate is treated with a silane coupling agent to enhance the bonding characteristics with the ultraviolet-curable resin provided hereafter. The ultraviolet-curable resin is dropped on a smooth mold substrate to connect the substrate in which the metal electrode pattern is formed (metal electrode substrate) as shown in FIG. 4(3). The ultraviolet-curable resin may be dropped on the metal electrode substrate instead of on the mold substrate. After both substrates are in close contact with each other by loading them, ultraviolet rays are irradiated to cure the ultraviolet-curable resin as shown in FIG. 4(4) (pressure-forming step). Then, the metal electrode substrate is separated from the mold substrate as shown in FIG. 4(5). Finally, the transparent electrode pattern composed of ITO is formed on the metal electrode substrate as shown in FIG. 4(6).

However, in such a method the following problems still remains: (a) It is difficult to form the resin layer between the metal electrode after forming the metal electrode pattern on the glass substrate; (b) It is difficult to electrically connect the metal electrode with the transparent electrode, in other words, to decrease its contact resistance; and (c) Since the metal electrode is formed directly on the glass substrate, some incident light reflects at the interface between the glass and metal, thus the visibility must be further improved when the electrode is used as the display.

These problems will be described in further detail.

Concerning item (a), the pressure forming set forth in FIG. 4(4) needs a great deal of time, since it is difficult to form thickly the metal electrode on the glass substrate. The reasons why the metal electrode cannot be formed thickly are as follows: it is difficult to form uniformly the thick metal film on the entire surface of the glass substrate, because, in the vacuum deposition method, such as sputtering, the irregular surface of the metal film is noticeable when the thickness exceeds approximately 2 to 3 μm. Control of the cell gap of the liquid crystal device becomes difficult with the increased in the irregular surface of the metal film. Even if the metal film is formed by plating, it is also difficult to obtain a uniform thickness with the increased thickness of the metal film.

The higher the resolution of the liquid crystal device, the smaller the pitch of the metal electrode. Thus, it is difficult to maintain the angle of view of the liquid crystal device with the increased thickness of the metal electrode. Accordingly, the increase in the metal film thickness is limited.

In the pressure forming set forth in FIG. 4(4), the ultraviolet-curable resin is dropped onto the mold substrate or metal electrode substrate, then the metal electrode substrate or mold substrate is contacted thereon. The ultraviolet-curable resin must be cured after the excessive resin is removed by pressing until the thickness of the ultraviolet-curable resin layer is equal to that of the metal electrode layer. The time t required for removing the ultraviolet-curable resin is proportional to the viscosity of the ultraviolet-curable resin and the square of the substrate size, viz. the resin-flowing width, and is inversely proportional to the pressure and the square of the final thickness of the ultraviolet-curable resin film as shown in the following equation [1]:

$$t \propto (\eta \times w^2)/(f \times h^2) \qquad [1]$$

wherein η represents the viscosity of the ultraviolet-curable resin, w represents the substrate size or the resin-flowing width, f represents the pressure, and h represents the final thickness of the ultraviolet-curable resin film.

Thus, the more the viscosity of the resin and the substrate size increase, the more the time is required for the pressure forming. Further, the more the thickness of the metal electrode, namely the final thickness of the ultraviolet-curable resin film, and the pressure increase, the less the time is required for the pressure forming.

The viscosity of the resin is approximately 20 cps, and the thickness of the metal electrode is approximately 2 to 3 μm because of the restriction on the film deposition. Further, an electrode substrate having a size of not less than 500 to 600 mm, for example, 850 by 650, 550 by 450, or 650 by 550, is required for the display usage. As a result of the calculation carried out under such conditions, every substrate needs 40 to 60 minutes for filling the resin between the metal electrodes. Thus, such a process is impractical.

Item (b) set forth above now will be explained. When an ultraviolet-curable resin is embedded between the metal electrodes as shown in FIG. 4, perfect removal of the resin on the metal electrode (the side forming the transparent electrode) is not necessarily easy. Thus, the contact resistance between the metal electrode and transparent electrode increases, and the contact resistance readily varies at different points.

Finally, item (c) will be explained. When the liquid crystal device is used as the display, the surface reflection must be reduced to improve the display quality. The surface reflectance depends on the area occupied by the metal electrode of the liquid crystal device, in other words, the aperture ratio of the liquid crystal device. For example, when the aperture ratio is 40%, the reflectance is estimated to be 7 to 9% at the protective acrylic resin plate surface provided at the surface of the display side, 3 to 4% at the polarizing plate surface, and 10 to 12% at the metal electrode surface, respectively. When the protective acrylic resin plate is subjected to an anti-glare treatment, or is not used, the reflectance can be suppressed. In such a case, the reflectance due to the metal electrode is, however, inevitable, resulting in the deterioration of visibility.

SUMMARY OF THE INVENTION

It is first object of the present invention to provide a electrode substrate, exhibiting an excellent electric connection between the metal electrode and transparent electrode and readily producible, a method for making the same, a liquid crystal device provided with the metal electrode substrate, and a method for producing the same.

It is second object of the present invention to provide a electrode substrate, exhibiting decreased visibility deterioration due to the reflection at the interface between the glass substrate and metal, a method for making the same, a liquid crystal device provided with the electrode substrate, and a method for producing the same.

In order to achieve the objects set forth above, the present invention is directed to an electrode substrate comprising:

at least a transparent electrode and metal electrode provided on a transparent substrate, the metal electrode being formed on the transparent substrate through a dielectric layer having an irregular surface.

The present invention is further directed to a liquid crystal device comprising:

at least a transparent electrode and metal electrode provided on a transparent substrate, the metal electrode being formed on the transparent substrate through a dielectric layer having an irregular surface.

As the dielectric layer set forth above, an organic resin layer is preferable, and an ultraviolet-curable resin layer is more preferable.

In a preferable embodiment, the metal electrode set forth above and the transparent electrode directly electrically contact each other.

The metal electrode set forth above can be replaced by a non-metal electrode having a low resistance, and preferably having a lower resistance than the transparent electrode.

The present invention is still further directed to a method for producing an electrode substrate having at least a transparent electrode and metal electrode provided on a transparent substrate, comprising:

a step for forming a first dielectric layer having an irregular surface on said transparent substrate;

a step for forming a metal electrode on at least one section of said first dielectric layer having the irregular surface;

a step for forming a second dielectric layer on the non-metal-wiring section of said first dielectric layer having the irregular surface; and a step for forming a transparent electrode on at least one section of said metal electrode and said second dielectric layer so as to contact electrically said metal electrode.

The present invention is further directed to a method for producing an electrode substrate having at least a transparent electrode and a metal electrode provided on a transparent substrate, comprising:

a step for forming a dielectric layer having an irregular surface on said transparent substrate;

a step for forming a metal electrode on at least dimple section of said dielectric layer having the irregular surface; and a step for forming a transparent electrode on at least one section of said metal electrode and said dielectric layer having the irregular surface so as to contact electrically said metal electrode.

In addition, the present invention is directed to a method for producing a liquid crystal device using the method for producing the electrode substrate set forth above.

BRIEF DESCRIPTION OF THE DRAWINGS

FIG. 4(1)–4(6) are a schematic cross-sectional views illustrating a method for producing the electrode substrate;

DETAILED DESCRIPTION OF THE PREFERRED EMBODIMENTS

The preferable embodiments in accordance with the present invention will now be explained with reference to figures.

Figure 1A:
FIG. 1A–1F are a schematic cross-sectional views illustrating an embodiment of an electrode substrate and a process for producing the same in accordance with the present invention.
Figure 1B:
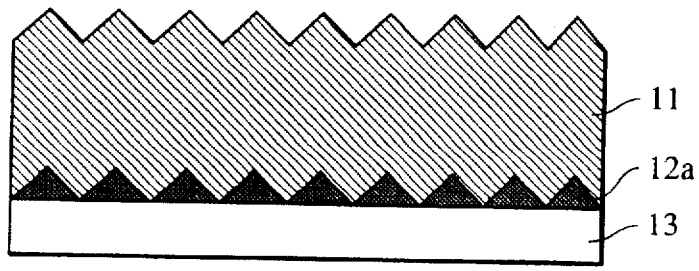
Figure 1C:
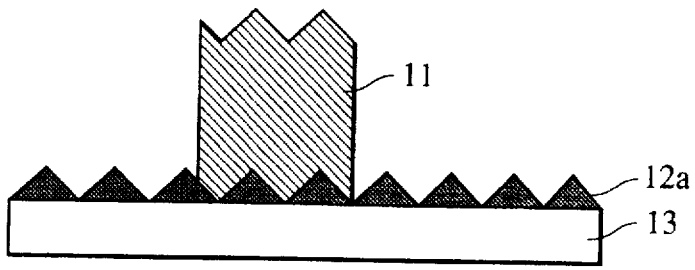
Figure 1D:
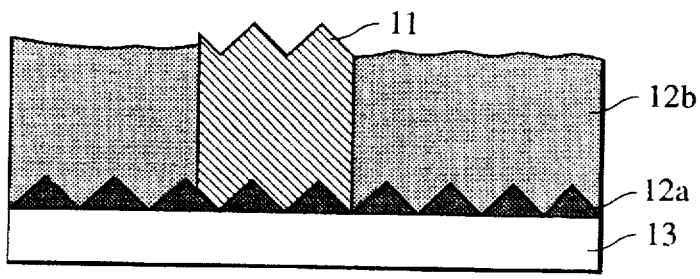
Figure 1E:
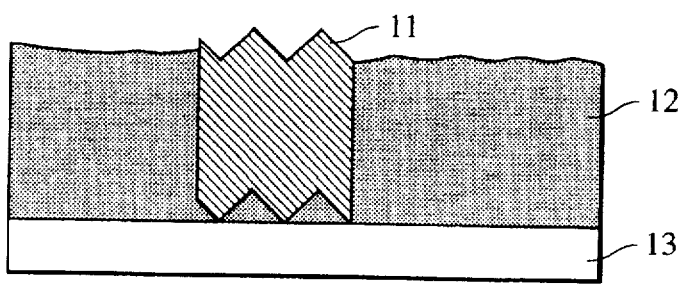
Figure 1F:
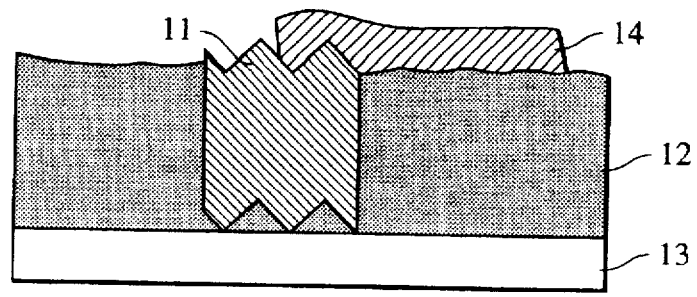

FIG. 1A–1F are a schematic cross-sectional views illustrating a first embodiment of an electrode substrate and a process for producing the same in accordance with the present invention. FIG. 1F is a schematic cross-sectional view illustrating an example of an electrode substrate in accordance with the first embodiment, in which an ultraviolet-curable resin (hereinafter UV resin) layer 12, a metal electrode layer 11, and a transparent electrode 14 are formed on a glass substrate 13.

As the UV resin composing the UV resin layer 12, any UV resin having a high light transmittance may be used according to demand. It is preferred to use UV resins each having almost the refractive index as that of glass used for the glass substrate, in order to reduce reflection and refraction at the interface between the glass substrate 13 and UV resin layer 12. In detail, the difference of the refractions between the UV resin and glass is preferably within ±0.1, and more preferably ±0.05. An example of preferable UV resins is an acrylic resin having a refractive index of 1.52 to 1.53.

Examples of metals used for the metal electrode layer 11 include low resistance metals, such as chromium, molybdenum, aluminum, copper, molybdenum/tantalum alloys, and aluminum/silicon/copper alloys. Further, the metal electrode layer 11 may be composed of a plurality of metal layers.

The metal electrode 11 can be replaced by a non-metal electrode layer having a low resistance. The resistance of the metal or non-metal electrode layer is preferably lower than that of the transparent electrode 14.

Examples of materials used for the transparent electrode 14 include indium oxide, tin oxide, and indium tin oxide (ITO). Between them, ITO and, in particular, ITO having a composition of indium:tin=85:15 to 97:3 may be preferably used because of a high light transmittance and low specific resistance.

The interface between the glass substrate 13 side of the metal electrode layer 11 and the UV resin layer 12 is irregular as shown in FIG. 1F. Thus, the light incident on the UV resin layer 11 from the glass substrate side is reflected at random or scattered at the irregular interface between the metal electrode layer 11 and UV resin layer 12. Therefore, in a liquid crystal device using the electrode substrate in accordance with this embodiment, the reflection of the sight due to the uniform reflection of the light from outside can be prevented.

Then, a method for producing the electrode substrate in accordance with the embodiment will be exemplified according to FIG. 1A–1F. After an uncured UV resin is dropped on the glass substrate, UV rays are irradiated thereto while pressing a mold substrate (not shown in the figure) having an irregular surface to form a first UV resin layer 12a having an irregular surface as shown in FIG. 1A. It is preferable to enhance the adhesiveness between the glass substrate and UV resin by treating the glass substrate surface with a silane coupling agent or the like before dropping the UV resin. The irregularity of the surface is composed of a plurality of flat or curved surfaces having different angles to the glass substrate plane so as to prevent a one-directional reflection of the incident light from the glass substrate 13 side, at the interface between the glass substrate 13 side of the metal electrode layer 13 and the UV resin layer 12a. The same continuous irregular pattern is not necessarily required, the depth of the irregular pattern is preferably larger than the wavelength of the incident light.

Although the bottom of the irregular pattern is in contact with the glass substrate 13 in FIG. 1A, such a contact is not essential. The distance between the bottom of the irregular pattern and the surface of the glass substrate 13 or the thickness of the UV resin layer at the bottom of the irregular pattern can be appropriately set according to the process without any restriction.

Then, a metal electrode layer 11 is deposited on the first UV layer 12a as shown in FIG. 1B, followed by patterning shown in FIG. 1C. Any conventional deposition method, such as vacuum evaporation, electron beam evaporation, ion plating, CVD, or sputtering, may be selected according to the metal material used or the like for forming the metal electrode layer 11. Any conventional patterning method, e.g. etching or photolithography, may be used according to the metal material used and the producing process.

A second UV resin layer 12b is formed so as to embed the section at which the metal electrode layer 11 is removed, as shown in FIG. 1D. The second UV resin layer may be formed by the method shown in FIG. 4(1)–4(6). It is preferable to use the same UV resin for the first and second UV resin layers 12a and 12b to reduce refraction and reflection. When both UV resin layers are formed by using the same UV resin, a UV resin layer 12 and the metal electrode layer 11 are formed on the glass substrate 13 without a boundary between the first and second UV resin layers 12a and 12b, as shown in FIG. 1E.

Finally, a transparent electrode 14 is formed on the metal electrode layer 11 and the UV resin layer 12 as shown in FIG. 1F, of which the transparent electrode 14 must be in electric contact with the metal electrode layer 11. The transparent electrode also may be formed by any conventional method similar to the method for the metal electrode layer 11.

In such a manner, an electrode substrate shown in FIG. 1F can be produced.

An example of the electrode substrate and the method for producing the same in accordance with the second embodiment of the present invention will now be explained with reference to FIGS. 2A–2F. FIG. 2F is a schematic cross-sectional view illustrating an example of the electrode substrate in accordance with the second embodiment of the present invention, in which a UV resin layer 22, a metal electrode layer 25, and a transparent electrode 26 are formed on a glass substrate 23. Similar materials shown in FIG. 1F can be used for the glass substrate 23, the UV resin layer 22, the metal electrode layer 25 and the transparent electrode 26. Further, it is preferable that the interface between the glass substrate 23 side of the metal electrode layer 25 and the UV resin layer 22 is finely irregular, not perfectly flat, in order to reduce the uniform reflection of the light from the outside.

An example of the method for producing the electrode substrate in accordance with this embodiment will now be explained according to FIGS. 2A–2F.

Figure 2A:
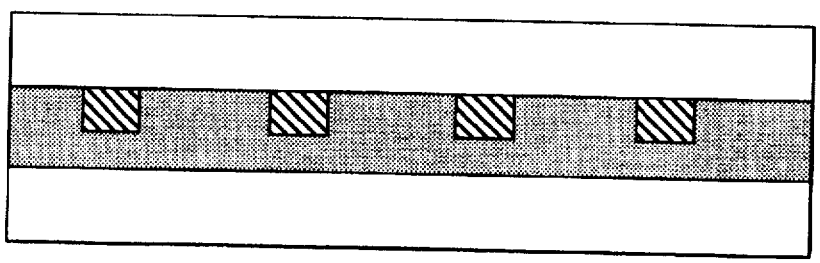
FIG. 2A–2F are a schematic cross-sectional views illustrating another embodiment of the electrode substrate and the process for producing the same in accordance with the present invention.
Figure 2B:
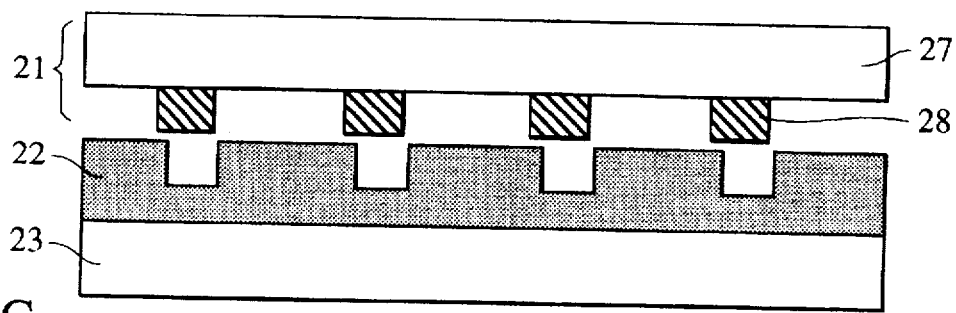

As shown in FIG. 2A, an uncured UV resin is dropped on the glass substrate 23, then UV rays are irradiated on the UV resin layer 22 while pressing with a mold substrate 21 having an irregular metal pattern 28 on the glass substrate 27. The metal surface (the lower side of the metal in FIG. 2A) is preferably provided with a fine irregularity, by means of any physical or chemical method. The mold substrate 21 is released to form the irregular UV resin layer 22 as shown in FIG. 2B. Any other material may be used instead of the glass substrate 27 and the metal pattern 28.

The surface of the glass substrate 23 may be preferably treated with a silane coupling agent to enhance the adhesiveness with the UV resin layer 22 before dropping the UV resin. Further, it is preferable to increase the cross-section of the metal pattern 28 toward the glass substrate 27, in other words, to decrease the cross-section out of the glass substrate 27, to improve the release properties between the mold substrate 21 and the UV resin layer 22.

Figure 2C:
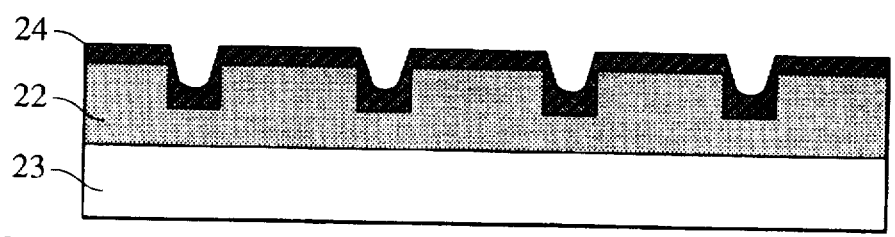
Figure 2D:
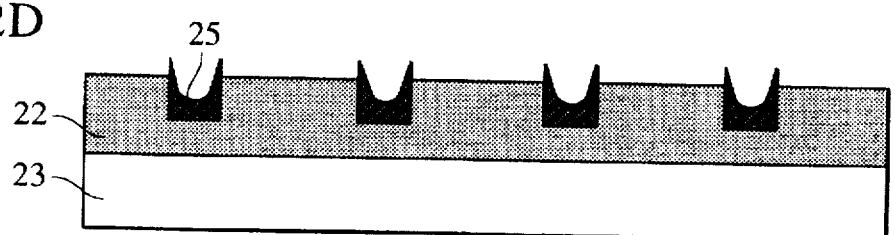
Figure 2E:
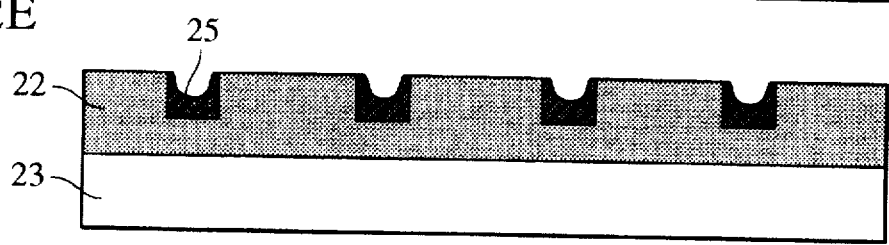
Figure 2F:
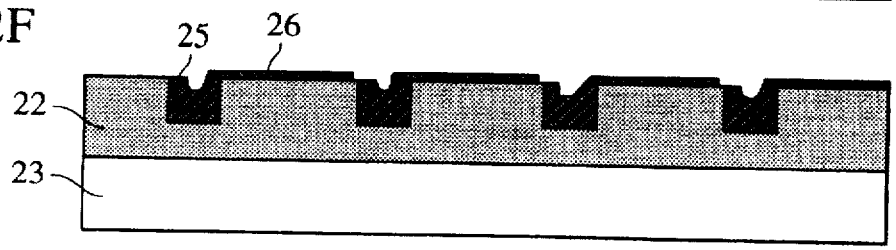

Then, a metal film 24 is deposited by any conventional deposition method as shown in FIG. 2C. The metal film 24 is subjected to patterning by etching and the like to form a metal electrode layer 25 at only the dimple of the UV resin layer 22 as shown in FIG. 2D. Further, the surface of the UV resin layer side of the substrate (the upper side in the FIG. 2C) is polished to remove a projection as shown in FIG. 2E. Since the projection forming is avoidable when the metal film 24 is excessively etched, such polishing can be omitted.

Finally, a transparent electrode 26 is formed as shown in FIG. 2F, by any conventional process similar to the first embodiment set forth above.

Figure 3A:
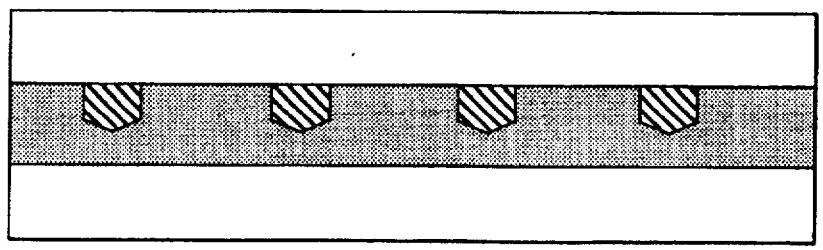
FIG. 3A–3F are a schematic cross-sectional views illustrating another embodiment of the electrode substrate and the process for producing the same in accordance with the present invention.
Figure 3B:
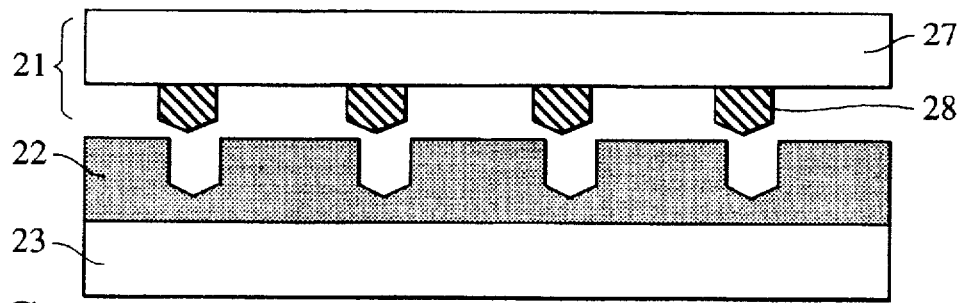
Figure 3C:
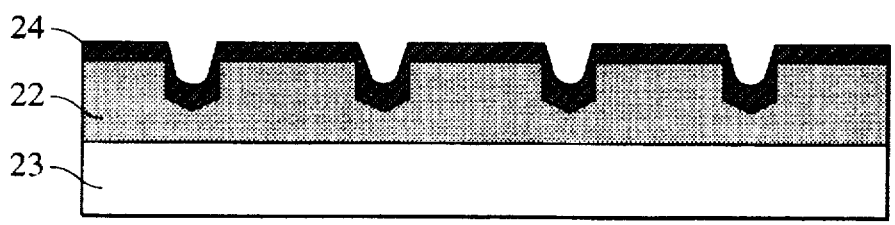
Figure 3D:
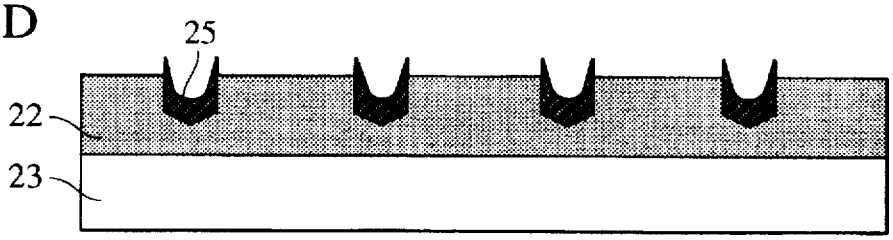
Figure 3E:
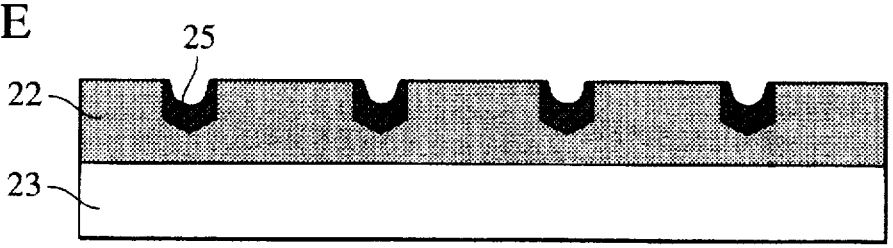
Figure 3F:
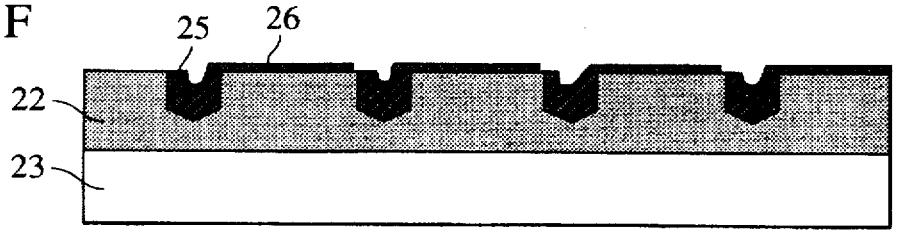
Figure 5A:
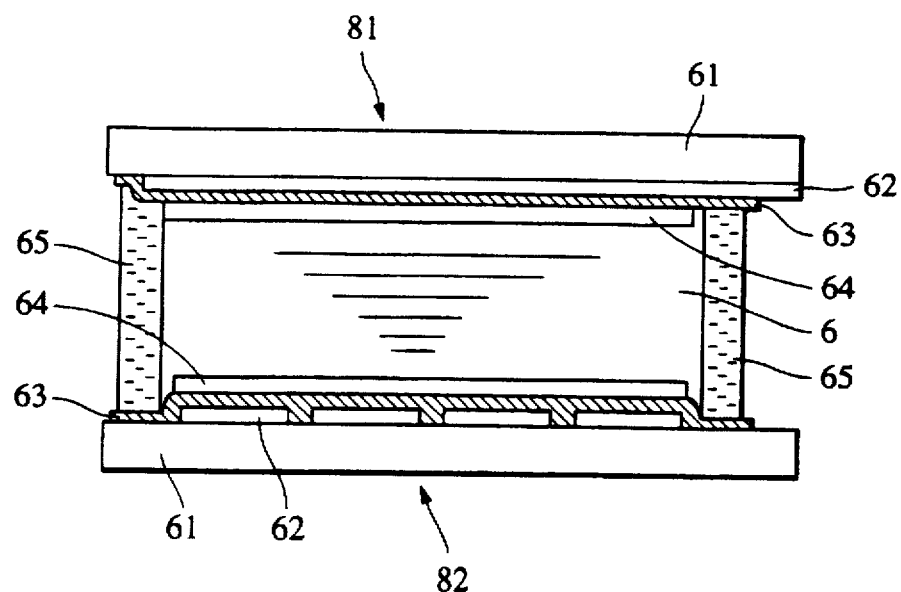
FIG. 5A is a schematic cross-sectional view illustrating a typical passive matrix liquid crystal device.
Figure 5B:
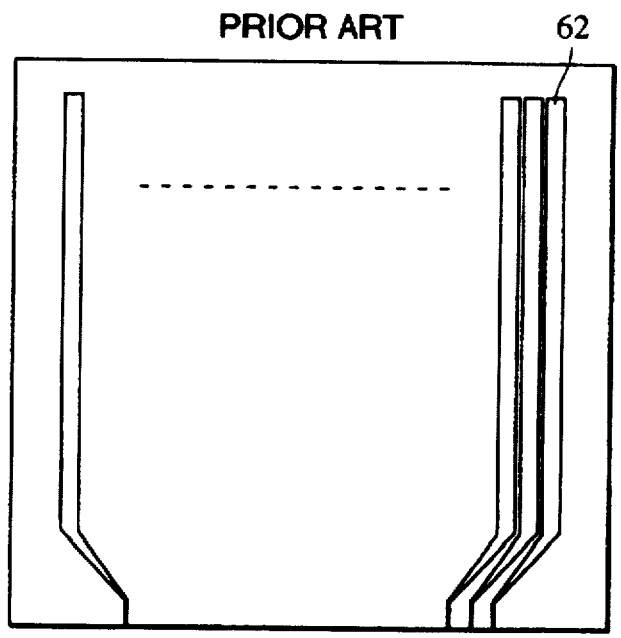
FIG. 5B is a schematic plan view illustrating an electrode substrate used for a typical passive matrix liquid crystal device.

FIG. 3A–3F show is another example of the second embodiment. In this example, the metal pattern 28 is pointed as shown in 3B so that the interface between the metal electrode layer 25 and the UV resin layer 22 has an irregular surface as shown in FIG. 3F. Other processes are based upon the second embodiment.

A liquid crystal device can be formed by providing an insulating film composed of $Ta_2O_5$ or the like and an alignment control film composed of polyimide or the like on each substrate described in the above embodiments, by joining two electrode substrates with a sealant to keep a given gap provided by the distribution of a plurality of spacer beads, and then by filling a liquid crystal into the gap.

Electrodes provided on both electrode substrates are opposed each other so as to form a matrix. Examples of the insulating film used include $SiO_2$ films, $TiO_2$ films, and $Ta_2O_5$ films each having a thickness of 20 to 300 nm.

Examples of the alignment film used include organic films, e.g. polyimide, polypyrrole, polyvinyl alcohol, polyamide-imide, polyester-imide, poly-para-xylene, polyester, polycarbonate, polyvinyl acetal, polyvinyl chloride, polyamide, polystyrene, polyaniline, cellose resins, acrylic resins, and melamine resins; and inorganic films, such as SiO oblique evaporated films. At least one alignment film among both films provided on the electrode substrates is preferably subjected to a uniaxial orientation treatment such as rubbing.

Nematic liquid crystals and chiral smectic liquid crystals may be used as the liquid crystal in accordance with the present invention. Between them, liquid crystal having at least two stable states or metastable states, e.g. bistable twisted nematic (BTN) liquid crystals, ferroelectric liquid crystals (FLC), and anti-ferroelectric liquid crystals (AFLC) may be preferably used.

Spacer beads, such as silica beads having a particle size of 1 to 5 µm and the like, can be selected according to the gap between the electrode substrates. A plurality of bead adhesive agents may be used together with spacer beads.

The electrode substrate in accordance with the present invention will be explained based on the examples below.

EXAMPLE 1

Onto a glass substrate of 300 mm by 300 mm, a 5% solution of A-174 (made by Nippon Unicar Co., Ltd.) in isopropyl alcohol was spin-coated at 2,000 rpm, followed by baking at 100° C. for one hour to enhance the adhesiveness with a UV resin. An acrylic monomer UV resin made by Nippon Kayaku Co., Ltd. was spin-coated on the treated surface of the glass substrate at an environmental temperature of 60° C. to form a UV resin layer. A mold substrate having a periodic irregular pattern, which was formed by polishing the surface of a steel substrate chemically plated with nickel and by machining it using a cutting tool, was in close contact with the UV resin layer under a reduced pressure, followed by pressing them with a load of 8.7 kgf/cm$^2$ for 3 minutes while maintaining the environmental temperature at 60° C.

After 18 seconds have passed from the pressure release, the UV resin was cured by irradiating UV rays of 200 J/cm$^2$ to form a first UV resin layer as shown in FIG. 1A. Onto the substrate provided with the first UV resin layer, 100 nm of a molybdenum layer, 1,700 nm of an aluminum layer, and 200 nm of a molybdenum layer were separately deposited by sputtering, followed by patterning with an acid mixture to form a metal electrode layer.

After forming a second UV resin layer as shown FIG. 4, around 150 nm of an ITO layer was deposited ban electrode subs an electrode substrate was formed by photolithographic patterning.

In the electrode substrate prepared by such a process and the liquid crystal device using the same, incident light from the glass substrate surface is reflected at random and scattered at the interface between the metal electrode layer and UV resin layer, and thus the uniform reflection of the sight from the outside can be prevented.

EXAMPLE 2

Onto a glass substrate, 100 nm of a molybdenum/titanium alloy (titanium content: 12.5%) and 1,900 nm of aluminum were separately deposited. The aluminum surface layer was subjected to machining with a cutting tool to form fine undulation. The molybdenum/titanium alloy and aluminum layers were subjected to patterning by an acid mixture to prepare a mold substrate as shown in FIG. 2A–2F. The molybdenum/titanium alloy well adheres to the glass substrate and aluminum has a large etching rate.

According to a procedure similar to EXAMPLE 1, onto the glass substrate of 300 mm by 300 mm, the 5% solution of A-174 (made by Nippon Unicar Co., Ltd.) in isopropyl alcohol was spin-coated at 2,000 rpm, followed by baking at 100° C. for one hour to enhance the adhesiveness with a UV resin. The acrylic monomer UV resin made by Nippon Kayaku Co., Ltd. was spin-coated on the treated surface of the glass substrate at an environmental temperature of 60° C. to form a UV resin layer. The mold substrate was in close contact with the UV resin layer while pressing for around 10 minutes as shown in FIG. 2A. After releasing the mold substrate, the UV resin was cured by irradiating UV rays of 200 J/cm$^2$ to form a UV resin layer having a thickness of approximately 0.1 mm.

Onto the UV resin layer, 100 nm of a molybdenum layer, 1,500 nm of an aluminum layer, and 200 nm of a molybdenum layer were separately deposited by sputtering to form a metal layer as shown in FIG. 2C. A metal electrode pattern was formed by treating with the acid mixture so as to leave the metal film at the dimple of the resin layer, and the metal projection overflowed from the dimple was removed by polishing.

Finally an electrode substrate was formed by patterning ITO similar to Example 1 as shown in FIG. 2F.

The UV resin layer is not formed on the metal electrode layer since the metal electrode layer is formed later than the UV resin layer as set forth above. Thus, the UV resin layer can be formed at a desirable thickness. Further, the process time can be reduced drastically, i.e. only 10 minutes for the process in accordance with present invention, whereas approximately 40 minutes for a conventional process. Moreover, the uniform reflection of the sight from the outside can be prevented by means of the finely irregular interface between the metal electrode layer and UV resin layer.

EXAMPLE 3

A mold substrate as shown in FIGS. 3A–3F was prepared in a manner similar to EXAMPLE 2, except that a periodic irregularity having a depth of approximately 1 µm and a period of approximately 2 µm was formed on the surface of the metal film by machining the metal film of the mold substrate by using a diamond cutting tool of which the tip angle was set at 45 degree. An electrode substrate as shown in FIG. 3F was formed from the mold substrate in a manner similar to EXAMPLE 2

In this EXAMPLE, effects, such as the decreased pressing time and the reduced uniform reflection of the sight from the outside were confirmed similar to EXAMPLE 2.

As set forth above, the electrode substrate and liquid crystal device using the same in accordance with the present invention can prevent the reflection of light from the outside due to the surface reflection at the glass substrate side of the metal electrode, because the dielectric layer is provided between the metal electrode and the glass substrate and the dielectric layer is formed to be irregular. Further, by forming the metal electrode on the dielectric layer selectively perforated, the electrode substrate can be readily produced.

The invention may be embodied in other specific forms without departing from the spirit or essential characteristics thereof. The present embodiments are therefore to be considered in all respects as illustrative and not respective, the scope of the invention being indicted by the appended claims rather than by foregoing description and all changes which come within the meaning and range of equivalency of the claims are therefore intended to be embraced therein.

What is claimed is:

1. An electrode substrate comprising:

at least a transparent electrode and a metal electrode provided on a transparent substrate, said metal electrode being formed on said transparent substrate through a dielectric layer having an irregular surface such that light incident on the dielectric layer from a transparent substrate side is reflected at random or scattered.

2. An electrode substrate according to claim 1, wherein said metal electrode and said transparent electrode directly contact each other.

3. An electrode substrate according to claim 1, wherein said dielectric layer comprises an organic resin.

4. An electrode substrate according to claim 3, wherein said organic resin is an ultraviolet-curable resin.

5. An electrode substrate according to claim 1, wherein at least one section of the interface between said metal electrode and said dielectric layer has an irregular surface.

6. A liquid crystal device provided with an electrode substrate comprising:

at least a transparent electrode and metal electrode provided on a transparent substrate, said metal electrode being formed on said transparent substrate through a dielectric layer having an irregular surface such that light incident on the dielectric layer from a transparent substrate side is reflected at random or scattered.

7. A liquid crystal device according to claim 6, wherein said metal electrode and said transparent electrode directly contact each other.

8. A liquid crystal device according to claim 6, wherein said dielectric layer comprises an organic resin.

9. A liquid crystal device according to claim 8, wherein said organic resin is an ultraviolet-curable resin.

10. A liquid crystal device according to claim 6, wherein at least one section of the interface between said metal electrode and said dielectric layer has an irregular surface.

11. A liquid crystal device according to any one of claims 6 to 10, wherein said liquid crystal is a chiral smectic liquid crystal.

12. A liquid crystal device according to any one of claims 6 to 10, wherein said liquid crystal is a ferroelectric liquid crystal.

13. A liquid crystal device according to any one of claims 6 to 10, wherein said liquid crystal is a liquid crystal having at least two stable states or metastable states.

14. An electrode substrate comprising:

at least a first electrode and a second electrode provided on a transparent substrate, said first electrode being a transparent electrode, said second electrode having a lower resistance than said first electrode, and said second electrode being formed on said transparent substrate through a dielectric layer having an irregular surface such that light incident on the dielectric layer from a transparent substrate side is reflected at random or scattered.

15. A liquid crystal device provided with an electrode substrate comprising:

at least a first electrode and a second electrode provided on a transparent substrate, said first electrode being a transparent electrode, said second electrode having a lower resistance than said first electrode, and said second electrode being formed on said transparent substrate through a dielectric layer having an irregular surface such that light incident on the dielectric layer from a transparent substrate side is reflected at random or scattered.

16. An electrode substrate comprising:

at least a transparent electrode and a metal electrode provided on a transparent substrate, said metal electrode being formed on said transparent substrate through a dielectric layer comprising an organic resin having an irregular surface.

17. An electrode substrate according to claim 16, wherein said organic resin is an ultraviolet-curable resin.

18. A liquid crystal device provided with an electrode substrate comprising:

at least a transparent electrode and a metal electrode provided on a transparent substrate, said metal electrode being formed on said transparent substrate through a dielectric layer comprising an organic resin having an irregular surface.

19. A liquid crystal device according to claim 18, wherein said organic resin is an ultraviolet-curable resin.

20. An electrode substrate comprising:

at least a first electrode and a second electrode provided on a transparent substrate, said first electrode being a transparent electrode, said second electrode having a lower resistance than said first electrode, and said second electrode being formed on said transparent substrate through a dielectric layer comprising an organic resin having an irregular surface.

21. An electrode substrate according to claim 20, wherein said organic resin is an ultraviolet curable resin.

22. A liquid crystal device provided with an electrode substrate comprising:

at least a first electrode and a second electrode provided on a transparent substrate, said first electrode being a transparent electrode, said second electrode having a lower resistance than said first electrode, and said second electrode being formed on said transparent substrate through a dielectric layer comprising an organic resin having an irregular surface.

23. A liquid crystal device according to claim 22, wherein said organic resin is an ultraviolet-curable resin.

24. An electrode substrate comprising:

a transparent substrate, a plurality of first electrodes disposed with a spacing therebetween on the transparent substrate through a first dielectric layer having an irregular surface, a second dielectric layer filling the spacing, and a plurality of second electrodes disposed so as to be in contact with the associated first electrodes, respectively, wherein the irregular surface comprises a surface oblique to the surface of the transparent substrate.

25. An electrode substrate according to claim 24, wherein said first electrodes are metal electrodes.

26. An electrode substrate according to claim 24, wherein said second electrodes are transparent electrodes.

27. An electrode substrate according to claim 25, wherein said second electrodes have a lower resistance than said first electrodes.

28. An electrode substrate among to claim 24, wherein said second dielectric layer composes an organic resin.

29. An electrode substrate according to claim 28, wherein said organic resin is an ultraviolet curable resin.

30. A liquid crystal device provided with an electrode substrate comprising:

a transparent substrate, a plurality of first electrodes disposed with a spacing therebetween on the transparent substrate through a first dielectric layer having an irregular surface, a second dielectric layer filling the spacing, and a plurality of second electrodes disposed so as to be in contact with the associated first electrodes, respectively, wherein the irregular surface comprises a surface oblique to the surface of the transparent substrate.

31. A liquid crystal device according to claim 30, wherein said first electrodes are metal electrodes.

32. A liquid crystal device according to claim 30, wherein said second electrodes are transparent electrodes.

33. A liquid crystal device according to claim 31, wherein said second electrodes have a lower resistance than said first electrodes.

34. A liquid crystal device according to claim 30, when said second dielectric layer comprises an organic resin.

35. A liquid crystal device according to claim 34, wherein said organic resin is an ultraviolet-curable resin.

* * * * *

UNITED STATES PATENT AND TRADEMARK OFFICE
CERTIFICATE OF CORRECTION

PATENT NO. : 5,777,710
DATED : July 7, 1998
INVENTOR(S) : SHINJIRO OKADA ET AL.

It is certified that error appears in the above-identified patent and that said Letters Patent is hereby corrected as shown below:

COVER PAGE AT [56], REFERENCES CITED

FOREIGN PATENT DOCUMENTS, "06347810" should read --06-347810--.

COLUMN 1

Line 47, "opposed" should read --opposed to--; and
    Line 49, "bonded" should read --bonded to--.

COLUMN 2

Line 25, "those" should read --that--; and
    Line 61, "electrode." should read --electrodes.--.

COLUMN 3

Line 7, "an" should read --a--;
    Line 13, "The difference of latter results in readily" should read --The latter difference readily results in the--;
    Line 14, "become" should read --becomes--;
    Line 26, "a" should be deleted and "view" should read --views--; and
    Line 53, "remains:" should read --remain--.

COLUMN 4

Line 7, "increased" should read --increase--.

UNITED STATES PATENT AND TRADEMARK OFFICE
CERTIFICATE OF CORRECTION

PATENT NO. : 5,777,710
DATED : July 7, 1998
INVENTOR(S) : SHINJIRO OKADA ET AL.

It is certified that error appears in the above-identified patent and that said Letters Patent is hereby corrected as shown below:

COLUMN 5

Line 10, "a" should read --an--; and
    Line 16, "a" should read --an--.

COLUMN 6

Line 1, "dimple" should read --a dimple--;
    Line 13, "FIG." should read --FIGS.--; and "a" should be deleted;
    Line 17, "FIG." should read --FIGS.--; and "a" should be deleted;
    Line 21, "FIG." should read --FIGS.--; and "a" should be deleted;
    Line 26, "FIG." should read --FIGS.--; and "a" should be deleted; and
    Line 40, "FIG." should read --FIGS.--; and "a" should be deleted.

COLUMN 7

Line 21, "FIG." should read --FIGS.--; and
    Line 57, "FIG." should read --FIGS.--.

COLUMN 8

Line 56, ""FIG." should read --FIGS.--; and "is" should be deleted.

COLUMN 9

Line 55, "ban eletrode" should read --by sputtering,--; and
    Line 56, "subs an" should read --and an--.

UNITED STATES PATENT AND TRADEMARK OFFICE
CERTIFICATE OF CORRECTION

PATENT NO. : 5,777,710
DATED : July 7, 1998
INVENTOR(S) : SHINJIRO OKADA ET AL.

It is certified that error appears in the above-identified patent and that said Letters Patent is hereby corrected as shown below:

COLUMN 10

Line 5, "FIG." should read --FIGS.--;
　　Line 36, "present" should read --the present--; and
　　Line 50, "degree." should read --degree--.

COLUMN 11

Line 2, "respective" should read --restrictive--; and
　　Line 3, "indicted" should read --indicated--.

COLUMN 12

Line 35, "ultraviolet curable" should read
　　　　--ultraviolet-curable--.

COLUMN 13

Line 2, "ultraviolet curable" should read
　　　　--ultraviolet-curable--.

UNITED STATES PATENT AND TRADEMARK OFFICE
CERTIFICATE OF CORRECTION

PATENT NO. : 5,777,710
DATED : July 7, 1998
INVENTOR(S) : SHINJIRO OKADA ET AL.

It is certified that error appears in the above-identified patent and that said Letters Patent is hereby corrected as shown below:

<u>COLUMN 14</u>

Line 8, "when" should read --wherein--.

Signed and Sealed this

First Day of June, 1999

Attest:

Q. TODD DICKINSON

*Attesting Officer*       *Acting Commissioner of Patents and Trademarks*